Figure 1:
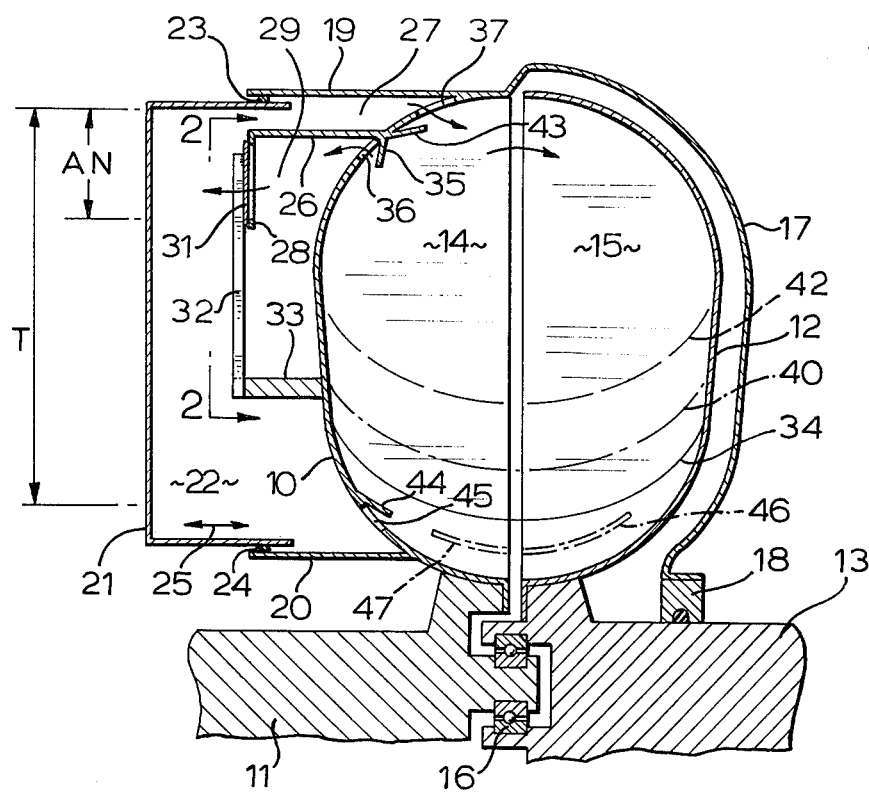

United States Patent [19]
Becker

[11] 3,955,368
[45] May 11, 1976

[54] HYDRAULIC COUPLING WITH CONTROLLABLE POWER TRANSMISSION CAPACITY

[75] Inventor: John E. Becker, Bowmanville, Canada

[73] Assignee: Cluaran Associates Ltd., Oshawa, Canada

[22] Filed: Mar. 3, 1975

[21] Appl. No.: 554,359

[30] Foreign Application Priority Data
Mar. 6, 1974 United Kingdom............... 10007/74

[52] U.S. Cl.................................. 60/357; 60/359; 60/364
[51] Int. Cl.[2] .................... F16D 33/06; F16D 33/12
[58] Field of Search ............ 60/330, 347, 357, 359, 60/364

[56] References Cited
UNITED STATES PATENTS
| | | | |
|---|---|---|---|
| 2,689,458 | 9/1954 | Weymann............................. | 60/359 |
| 3,399,533 | 9/1968 | Becker............................. | 60/357 R |

FOREIGN PATENTS OR APPLICATIONS
| | | | |
|---|---|---|---|
| 790,603 | 12/1958 | United Kingdom................... | 60/359 |

Primary Examiner—Edgar W. Geoghegan
Attorney, Agent, or Firm—Hirons & Rogers

[57] ABSTRACT

In a hydraulic coupling the pump element is provided with an annular reservoir rotatable therewith, the reservoir having its interior divided into separate analogization and stall compartments by a weir. A first set of catches feeds liquid from the working chamber into the analogization compartment and the volume which can remain therein is controlled by speed sensitive valves which feed excess liquid into the stall compartment from wherein it returns to the working chamber. The valve control the filling of the working chamber so that the power transmission capacity of the coupling is maintained analogous with the power output of the associated prime mover at that speed. Upon the existence of stall conditions with the turbine element a second set of radially-inward catches are engaged by the working liquid and fill the stall compartment to almost empty the working compartment and permit the coupling to continue operating without dangerous overload of itself or the prime mover.

13 Claims, 7 Drawing Figures

U.S. Patent  May 11, 1976  Sheet 1 of 3  3,955,368

HYDRAULIC COUPLING WITH CONTROLLABLE POWER TRANSMISSION CAPACITY

The present invention is concerned with improvements in or relating to hydraulic couplings, and especially to such couplings wherein the power transmission capacity can be controlled to be analogous with the power output of an associated prime mover such as a driving motor.

Hydraulic couplings in which the power transmission capacity can be controlled or "analogized" as the speed of operation of the coupling varies have been disclosed hitherto in my U.S. Pat. No. 3,237,409 wherein fluid is removed by means of a scoop tube from a reservoir associated with the working chamber and is returned to the working chamber under control of speed responsive valves. An example of a valve-controlled fluid clutch is disclosed in my U.S. application Ser. No. 225,514, now U.S. Pat. No. 3,751,923 granted Aug. 14, 1973.

It is an object of the present invention to provide a new hydraulic coupling with controllable power transmission capacity.

It is a more specific object to provide such a controllable coupling in which transfer of working fluid between the working chamber and a controlled volume reservoir can be effected without the use of scoop tubes or the like, avoiding the need for a collecting compartment in which the scoop tube must operate.

In accordance with the present invention there is provided a hydraulic coupling comprising cooperating pump and turbine elements each having therein a respective set of radial vortex-producing vanes and mounted for rotation about coaxial axes, means for connecting the pump and turbine elements respectively to a prime mover and means to be driven by the coupling, a reservoir rotatable with the pump element, catch means in the working chamber operative under normal operating conditions for feeding operating fluid continuously from the working chamber to the reservoir, speed responsive valve means in the reservoir controlling the return of operating fluid to the working chamber and thereby controlling the quantity of working fluid in the coupling for analogization of its power transmission capacity, and catch means in the working chamber intercepting working liquid upon the existence of stall conditions with the turbine element and delivering liquid to the reservoir to reduce the power transmission capacity automatically to the lower value.

Figure 2:
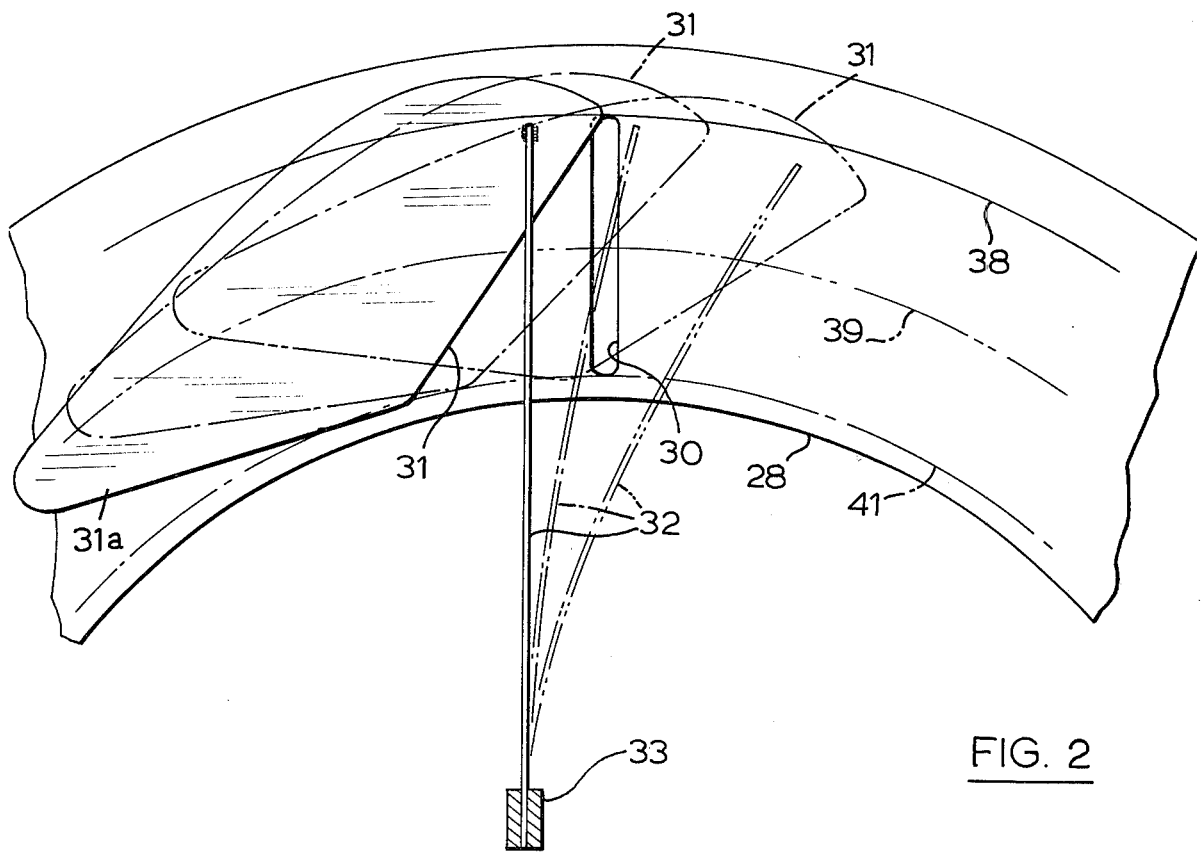
Figure 3:
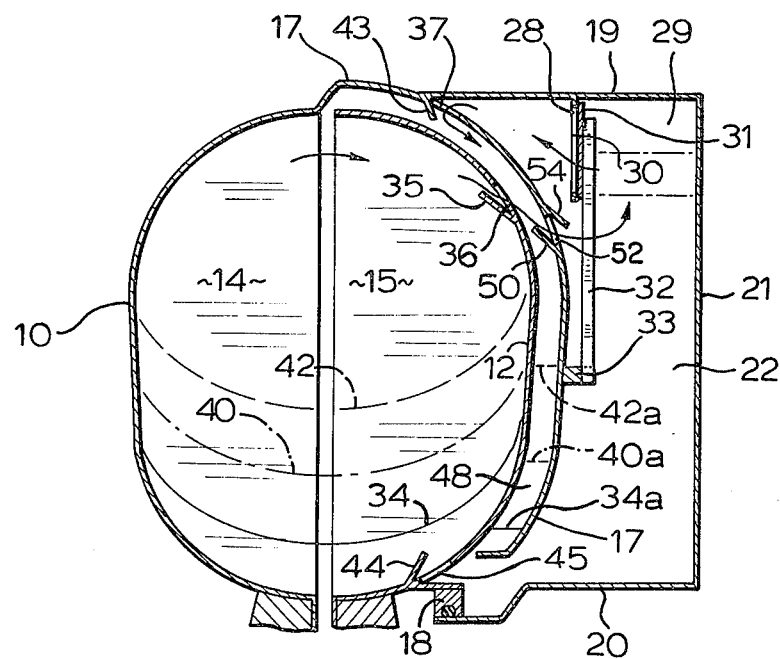
Figure 4:
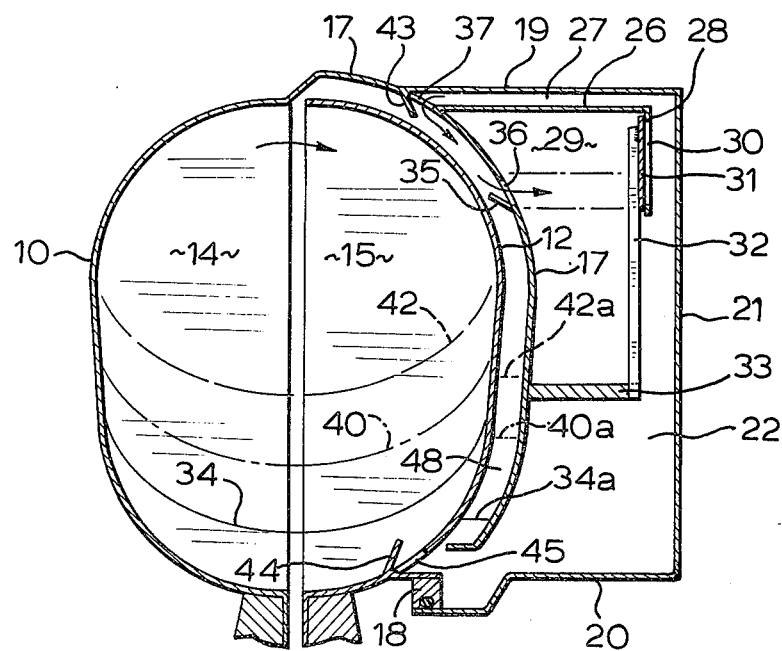
Figure 5:
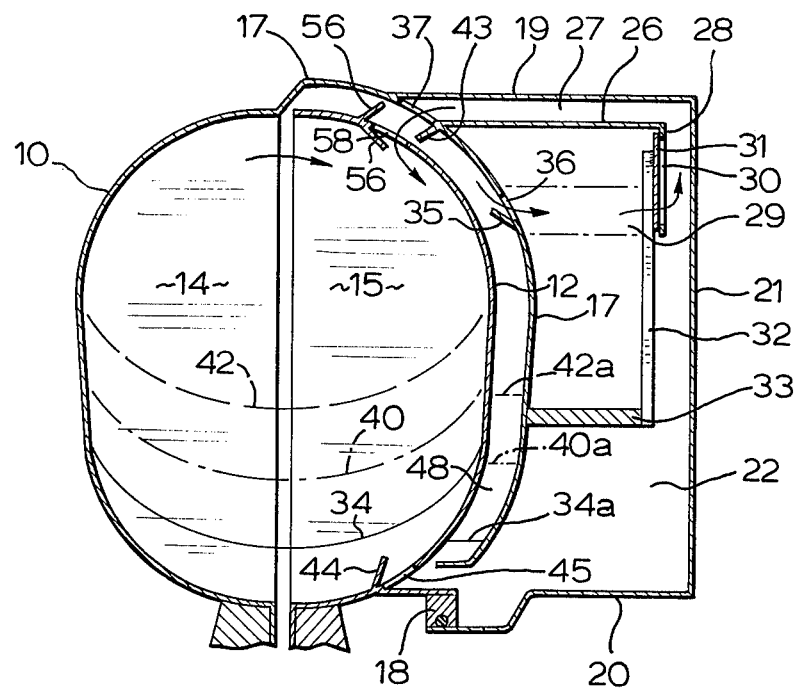
Figure 6:
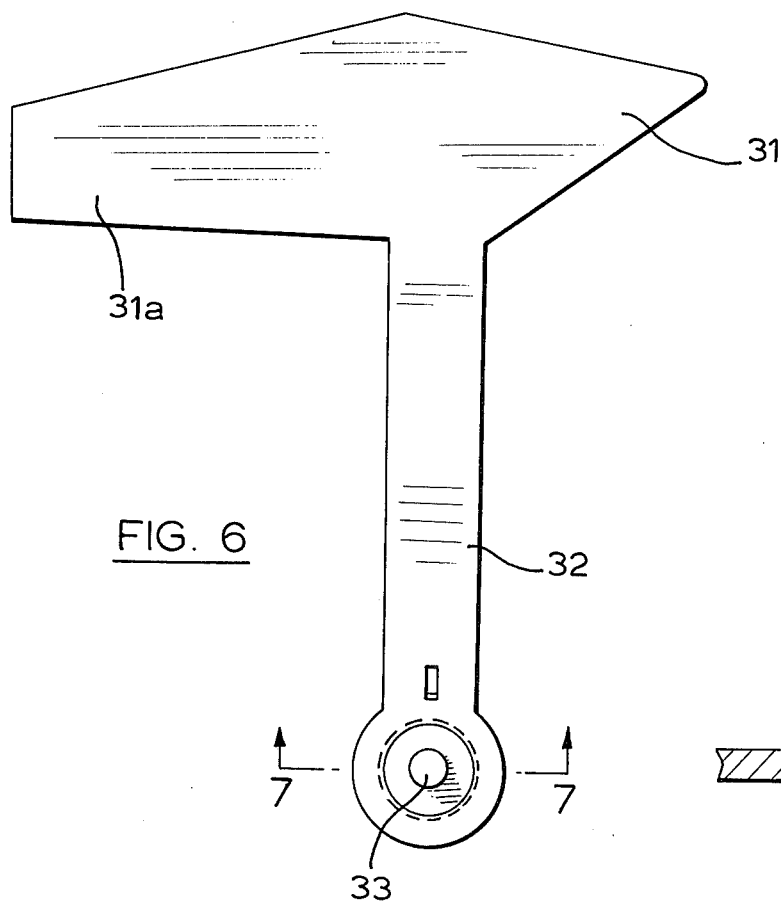
Figure 7:
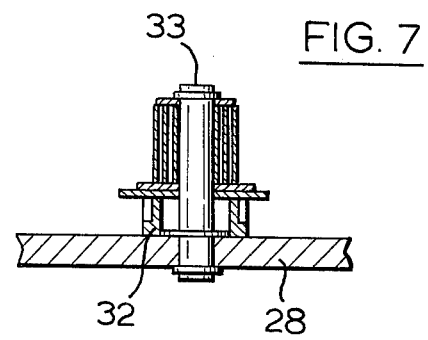

Particular preferred embodiments of the invention will now be described, by way of example, with reference to the accompanying diagrammatic drawings, wherein:

FIG. 1 is a plane cross-section through the upper part of a hydraulic coupling which is a first embodiment, taken on the axis of rotation thereof, wherein the reservoir mounted on the pump element is disposed on the pump side of the coupling, FIG. 2 is a view taken on the line 2—2 of FIG. 1 to show the structure and operation of a speed responsive valve usable in the couplings of this invention, FIGS. 3 to 5 are views similar to FIG. 1 of other couplings embodying the invention wherein the reservoir is disposed on the turbine element side, FIG. 6 is a view similar to FIG. 2 of another speed responsive valve construction, and FIG. 7 is a view on the line 7—7 of FIG. 6.

Similar parts are given the same reference in all the Figures of the drawings.

The hydraulic coupling particularly illustrated herein by FIGS. 1 and 2 comprises a pump element 10 connected to a power input shaft 11 that is in turn adapted to be connected to a prime mover, and a turbine element 12 connected to a power output shaft 13 that is in turn adapted to be connected to apparatus to be driven via the coupling. The pump and turbine interior together form the conventional toroidal-shaped working chamber. The pump interior is provided with the conventional fixed radially-extending, vortex-producing vanes 14 while the turbine chamber is provided with cooperating vanes 15. In this embodiment the immediately adjacent inner ends of the two shafts 11 and 13 are mutually supported by a ball thrust bearing 16. An extension 17 of the pump element surrounds the turbine element in known manner to retain the working liquid in the coupling, a rotatable, fluid-tight joint 18 being provided between the radially-inner end of the said extension 17 and the adjacent part of the shaft 13.

The pump element shell is provided with a radially-outer cylindrical extension 19 and a radially-inner cylindrical extension 20, these extensions cooperating with a ring-shaped member 21 to form between themselves an annular reservoir 22 mounted by and rotatable with the pump element 10. The joints between the members 19 to 21 are sealed by seal members 23 and 24, these seal members permitting relative movement of the members 19 to 21, as indicated by the arrows 25, to permit adjustment of the volume of the reservoir 22.

Another cylindrical member 26 extends into the reservoir 22 close and parallel to the extension 19 to form an annular passage 27 therebetween, and the free end of the member or weir carries an annular baffle member 28 forming an analogization compartment 29 between itself and the adjacent walls of member 21. The baffle member or weir 28 is provided with a plurality of radially-extending slots 30, each of which has a speed-controlled valve member associated therewith. In this particular embodiment each valve member comprises a flat metal blade 31 mounted by a spring arm 32 secured at 32 to a support 33, so as to be close to the barrier 28 and able to progressively close the slot 30, as described below.

In order to describe the operation of the coupling of the invention it is assumed that the coupling members are rotating at a low speed but with normal slip between them and with torque transmitting vortices fully established. The working fluid in the working chamber will be at level indicated by the solid line 34, while each valve member 31 will be in the position shown in solid lines in FIG. 2, in which the associated slot 30 is fully open. Operating fluid in the vortices is intercepted by a plurality of catches 35 on the walls of the pump element and fed by corresponding apertures 36 into the compartment 29, from which it immediately passes under the action of centrifugal force through the slots 30, passageway 27 and apertures 37 back to the working chamber, so that very little of it remains in the compartment 29, the fluid level therein being indicated by the solid line 38 in FIG. 2.

The tail 31a of each valve member 31 is shaped and weighted so that as the pump element speed increases, the tail moves radially outward under the action of centrifugal force against the resilience of the spring blade 32, and the leading edges of the valve members progressively closes the slots 30. By way of illustration, when the pump speed is at a medium value the valve members have moved to respective positions shown by chain-dotted lines in FIG. 2, and the resulting increased fluid level in the compartment 29 is indicated by the line 39. The amount of fluid now retained in the analogization compartment 29 is made such that the reduced amount of fluid in the working chamber, the level of which is indicated by line 40, can just transmit the required amount of power, the increased power transmission of the vortices due to the increased pump speed being compensated by their reduced volume.

When the pump is rotating at maximum designed speed the valve elements move to the extreme position shown in broken lines in FIG. 2, and the fluid level in the compartment is now as indicated by the line 41, while the corresponding level of the vortices in the working chamber is indicated by the line 42. As the pump speed decreases the resilience of the springs 32 returns the valve members towards their original positions opening the slots 30 and thereby returning more of the working fluid to the working chamber and maintaining the desired analogization of coupling speed and its power transmission capacity.

In this embodiment suction-inducing shields 43 are provided upstream of the apertures 37 to facilitate the flow of the working fluid therethrough.

Upon the establishment of a stall condition of the turbine element, owing for example, to a sudden overload of the element, the normal vortices are disrupted and the working fluid instead flows over the inner surfaces of the pump and turbine elements. In these circumstances the working liquid will be intercepted by a plurality of catches 44 disposed at a radially inner part of the pump wall so that normally they are clear of the working fluid. The catches feed the liquid at high rate through apertures 45 into the reservoir 22. The amount of fluid in the working chamber is thereby quickly reduced to a value such that the coupling cannot transmit much more than its normal amount of power, so that a dangerous overload is not applied to the prime mover, but instead it can continue to operate as though the stall condition had not occurred and can continue to struggle to drive the turbine element until the stall condition is removed and normal operation is restored. Additional catches or guides 46 and 47 may be provided respectively in the turbine and pump elements to facilitate the feeding of the fluid at stall to the catches 44 and openings 45. The part of the reservoir 22 employed in providing power transmission analogization is indicated by AN, while the part employed in preventing stall torque overload is indicated by T, and it will be seen that the volume required for the latter purpose can readily be adjusted by suitable axial movement of the reservoir part 21. For further discussion and disclosure of the operation of such stall torque overload protection means in a hydraulic clutch or coupling reference is made to my Canadian Pat. Ser. No. 896,311, issued Mar. 28, 1972.

As stated above parts in FIGS. 3 to 7 are given the same reference as their equivalent parts in FIGS. 1 and 2. In the couplings of FIGS. 3 to 5 the reservoir 22 is of fixed predetermined volume and is disposed on the turbine side of the coupling, the joint 18 being formed between the extension 20 and the adjacent part of the turbine casing.

In the embodiment of FIG. 3 catches 35 and 44 are provided in the wall of the turbine element and not the pump element and the catches 35 will feed the working fluid into the space 48 between the turbine element outer wall and the pump extension 17. With the liquid at level 34 in the working chamber the liquid in the space 48 will be at level 34a so that catches 50 in the extension wall 17 are completely submerged and will feed liquid through apertures 52 into the reservoir 22, the flow being assisted by deflectors 54. It will be seen that the chamber 29 is formed on the side of baffle 28 further from the turbine element. The catches 50 will remain submerged even when the working fluid level in the space 48 has decreased to 42a.

In the embodiment of FIG. 4 the catches 35 are provided in the extension 17 and the apertures 37 return the fluid to the space 48; there are no catches in the wall of either the pump or turbine elements to intercept the vortices.

The embodiment of FIG. 5 is similar to that of FIG. 4, in that the catches 35 are provided in the pump element extension 17, but in this case liquid from the apertures 37 is directed by deflectors 56 through apertures 58 in the turbine wall directly back into the working chamber.

The speed sensitive valve shown in FIGS. 6 and 7 differs from that of FIG. 2 in that the arm 32 is rigid and is pivoted on the rod 33, the movement of the blade 31 and the arm, under the effect of centrifugal force on weighted tail end 31a, being controlled by a spiral spring mounted around the pivot 33.

I claim:

1. A hydraulic coupling comprising cooperating pump and turbine elements each having therein a respective set of radial vortex-producing vanes and mounted for rotation about coaxial axes, means for connecting the pump and turbine elements respectively to a prime mover and means to be driven by the coupling, a reservoir rotatable with the pump element, catch means in the working chamber operative under normal operating conditions for feeding operating fluid continuously from the working chamber to the reservoir, speed responsive valve means in the reservoir controlling the return of operating fluid to the working fluid in the coupling for analogization of its power transmission capacity, and catch means in the working chamber intercepting working liquid upon the existence of stall conditions with the turbine element and delivering liquid to the reservoir to reduce the power transmission capacity automatically to the lower value.

2. A hydraulic coupling as claimed in claim 1, wherein the reservoir is of annular form and has in its interior a radially-inwardly extending annular weir dividing the interior into an analogization compartment into which working liquid is fed by the first-mentioned catch means, and a stall compartment of larger volume into which working liquid is fed by the second-mentioned catch means, and the speed responsive valve means controls the transfer of working liquid from the analogization compartment into the stall compartment.

3. A hydraulic coupling as claimed in claim 2, wherein the weir is provided with radially-extending slots and each valve means comprises a flat blade movable circumferentially of the respective slot to close it progressively radially inwards and thereby increase progressively the quantity of liquid retained in the analogization compartment.

4. A hydraulic coupling as claimed in claim 3, wherein each of said flat blades is mounted by means of a respective radially outwardly extending spring arm which bends against the action of its own resilience to move the blade under the centrifugal force applied to the blade upon rotation of the reservoir.

5. A hydraulic coupling as claimed in claim 3, wherein each of said blades is mounted by means of a rigid pivoted arm which pivots against the resilience of a coiled spring to move the blade under the centrifugal force applied to the blade upon rotation of the reservoir.

6. A hydraulic coupling as claimed in claim 1 wherein the reservoir is mounted on the pump element on the side thereof further from the turbine element, and the first-mentioned catch means are disposed in the pump element wall radially-inwardly from apertures returning liquid from the reservoir to the working circuit.

7. A hydraulic coupling as claimed in claim 6, wherein the returning apertures are provided with suction-inducing shields disposed in the working chamber adjacent the apertures.

8. A hydraulic coupling as claimed in claim 1 wherein the reservoir is mounted on the pump element with the turbine element between the pump element and the reservoir and both the first and second-mentioned catch means are provided in the wall of the turbine element, the reservoir returning liquid to the working circuit via the space between the turbine element wall and the adjacent reservoir wall.

9. A hydraulic coupling as claimed in claim 1 wherein the reservoir is mounted on the pump element with the turbine element between the pump element and the reservoir, wherein the first-mentioned catch means are provided in the space between the turbine element wall and the adjacent reservoir wall, and the second-mentioned catch means are provided in the wall of the turbine element, the reservoir returning liquid to the working circuit via the space between the turbine element wall and the adjacent reservoir wall.

10. A hydraulic coupling as claimed in claim 2, wherein the reservoir is mounted on the pump element on the side thereof further from the turbine element, and the first-mentioned catch means are disposed in the pump element wall radially-inwardly from apertures returning liquid from the reservoir to the working circuit.

11. A hydraulic coupling as claimed in claim 10, wherein the returning apertures are provided with suction-inducing shields disposed in the working chamber adjacent the apertures.

12. A hydraulic coupling as claimed in claim 2, wherein the reservoir is mounted on the pump element with the turbine element between the pump element and the reservoir and both the first and second-mentioned catch means are provided in the wall of the turbine element, the reservoir returning liquid to the working circuit via the space between the turbine element wall and the adjacent reservoir wall.

13. A hydraulic coupling as claimed in claim 2, wherein the reservoir is mounted on the pump element with the turbine element between the pump element and the reservoir, wherein the first-mentioned catch means are provided in the space between the turbine element wall and the adjacent reservoir wall, and the second-mentioned catch means are provided in the wall of the turbine element, the reservoir returning liquid to the working circuit via the space between the turbine element wall and the adjacent reservoir wall.

* * * * *